(12) United States Patent
Kato

(10) Patent No.: US 7,437,011 B2
(45) Date of Patent: Oct. 14, 2008

(54) IMAGE PROCESSING APPARATUS AND METHOD

(75) Inventor: Masami Kato, Kanagawa-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 990 days.

(21) Appl. No.: 10/714,637

(22) Filed: Nov. 18, 2003

(65) Prior Publication Data
US 2004/0120399 A1 Jun. 24, 2004

Related U.S. Application Data

(62) Division of application No. 09/466,907, filed on Dec. 20, 1999, now Pat. No. 6,665,446.

(30) Foreign Application Priority Data
Dec. 25, 1998 (JP) ............................... 10-371479

(51) Int. Cl.
*G06K 9/36* (2006.01)
*G06K 9/38* (2006.01)

(52) U.S. Cl. .................................................... 382/251

(58) Field of Classification Search ......... 382/232–251, 382/282–283, 118, 166, 181, 162–165; 348/14.01–14.16; 375/240.01–240.26
See application file for complete search history.

(56) References Cited

U.S. PATENT DOCUMENTS 6,272,253 B1  8/2001 Bannon et al. .............. 382/236

6,275,614 B1  8/2001 Krishnamurthy et al. .... 382/224

FOREIGN PATENT DOCUMENTS

JP  7-203436  8/1995

OTHER PUBLICATIONS

Huasheng et al., "Face tracking using skin-color model and gabor wavelet", IEEE 0-7803-7488-6/02, pp. 837-840.
Barzykina et al., Image compression for facial photographs, Mar. 1997, IEEE 0-7803-3905, pp. 322-325.

*Primary Examiner*—Sherali Ishrat
(74) *Attorney, Agent, or Firm*—Fitzpatrick, Cella, Harper & Scinto

(57) ABSTRACT

A color-space conversion processor converts input digital image data into YUV color space, and a wavelet conversion processor performs wavelet conversion processing on the data. A face-area recognition processor extracts a face area in the image based on the obtained conversion coefficients. A quantization processor performs quantization processing on the input conversion coefficients while changing quantization coefficients used in the quantization processing in and out of the extracted face area. A variable-length coding processor encodes the quantized coefficients. A code synthesizing processor synthesizes the obtained respective color component code data with information indicating the face area extracted by the face-area recognition processor, and outputs the synthesized data as a code string.

15 Claims, 14 Drawing Sheets

FIG. 13

| | LL2 | LH2 | HL2 | HH2 | LH1 | HL1 | HH1 | LH0 | HL0 | HH0 |
|---|---|---|---|---|---|---|---|---|---|---|
| QUANTIZATION COEFFICIENT OF FACE AREA | Q | Q×2 | Q×2 | Q×2 | Q×4 | Q×4 | Q×4 | Q×8 | Q×8 | Q×8 |
| QUANTIZATION COEFFICIENT OF NON-FACE AREA | Q | Q×8 | Q×8 | Q×8 | Q×16 | Q×16 | Q×16 | Q×32 | Q×32 | Q×32 |

IMAGE PROCESSING APPARATUS AND METHOD

This application is a division of Application No. 09/466,907, filed Dec. 20, 1999 now U.S. Pat. No 6,665,446.

BACKGROUND OF THE INVENTION

The present invention relates to an image processing apparatus and method preferably applicable to a video communication apparatus in a video conference system or the like using video and audio data.

As image compression methods used in video communication apparatuses, high-performance coding methods based on DCT (Discrete Cosine Transformation) as in the ITU-T Recommendations H.261, H263 and the like are widely used. However, in application to a narrow-bandwidth communication environment such as the Internet, as the coding amount must be greatly reduced with a high compression rate, a problem occurs due to degradation of image quality even in use of these high-performance compression coding methods.

Accordingly, in a video conference system or the like, a method for satisfying subjective image quality has been developed. That is, in an obtained image of a person, a large coding amount is allotted to a face area which is the most important part of the image, and the coding amounts in the other areas are greatly reduced, so as to reduce the total coding amount. For example, Japanese Published Unexamined Patent Application No. Hei 7-203436 proposes a DCT-based image compression device which improves subjective image quality while suppressing the entire coding amount by recognizing a face area, selecting a plurality of quantization tables based on the result of recognition, and allotting a large amount of code data to the most important face area.

However, in case of coding amount control based on each image area by using the conventional DCT-based coding method, remarkable block distortion and/or mosquito noise occurs in an area determined as a part other than an important part. Accordingly, the subjective image quality is seriously degraded, and a decoded image seems unnatural. Further, a pseudo outline occurs in the border between an area determined as an important part and an area determined as a part other than the important part, and the obtained image seems further unnatural.

To solve the above problems, low-frequency filtering processing can be performed on an area determined as a non-face area (unimportant part). That is, prefiltering processing is performed to attenuate high frequency components in the unimportant part in advance, to suppress the coding amount in compression processing, and to reduce mosquito noise which occurs due to quantization on the high frequency components.

On the other hand, the receiving side performs decompression processing on bitmapped code data to image data. Then, the image data decompressed by the decompression processing is color-space filtered by postfiltering processing. In the postfiltering processing, removal processing is performed to remove block distortion which is remarkable in a highly-compressed image area determined as a non-face area, and adaptive filtering processing is performed to remove a pseudo outline occurs in the border between face and non-face areas.

As described above, when a quantization control function based on recognition of important area is added to a DCT-based image coding method, to suppress subjective image degradation, various additional correction processing such as adaptive filtering processings are required. Accordingly, if such processings are realized by software, processing time increases. Further, if the processing are realized by hardware, the circuit scale increases.

SUMMARY OF THE INVENTION

The present invention has been made in consideration of the above-described problems, and has its object to realize high-performance image quantization maintaining high image quality by simple processing.

Further, another object of the present invention is to realize high-performance image data compression maintaining high image quality by changing a quantization characteristic in a specific area extracted from an image and other areas.

According to the present invention, the foregoing objects are attained by providing an image processing apparatus comprising: conversion means for converting input digital image data into coefficients based on spatial frequencies to obtain conversion coefficients; extraction means for extracting a specific area in an image represented by the digital image data based on the conversion coefficients; and quantization means for performing quantization processing on the conversion coefficients while changing a quantization characteristic in accordance with the specific area extracted by the extraction means.

Further, another object of the present invention is to attain high-speed specific-area extraction processing by extracting the specific area using a low-frequency component image data resulted from wavelet conversion processing.

Further, another object of the present invention is to attain high-speed specific-area extraction processing by using image data thinned in accordance with a predetermined reduction rate to extract the specific area.

Further, another object of the present invention is attain simplification of processing by extracting an area having a predetermined size and a predetermined shape, as the specific area.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a table showing quantization coefficient values according to the embodiment;

DETAILED DESCRIPTION OF THE PREFERRED EMBODIMENT

A preferred embodiment of the present invention will now be described in detail in accordance with the accompanying drawings.

Figure 1:
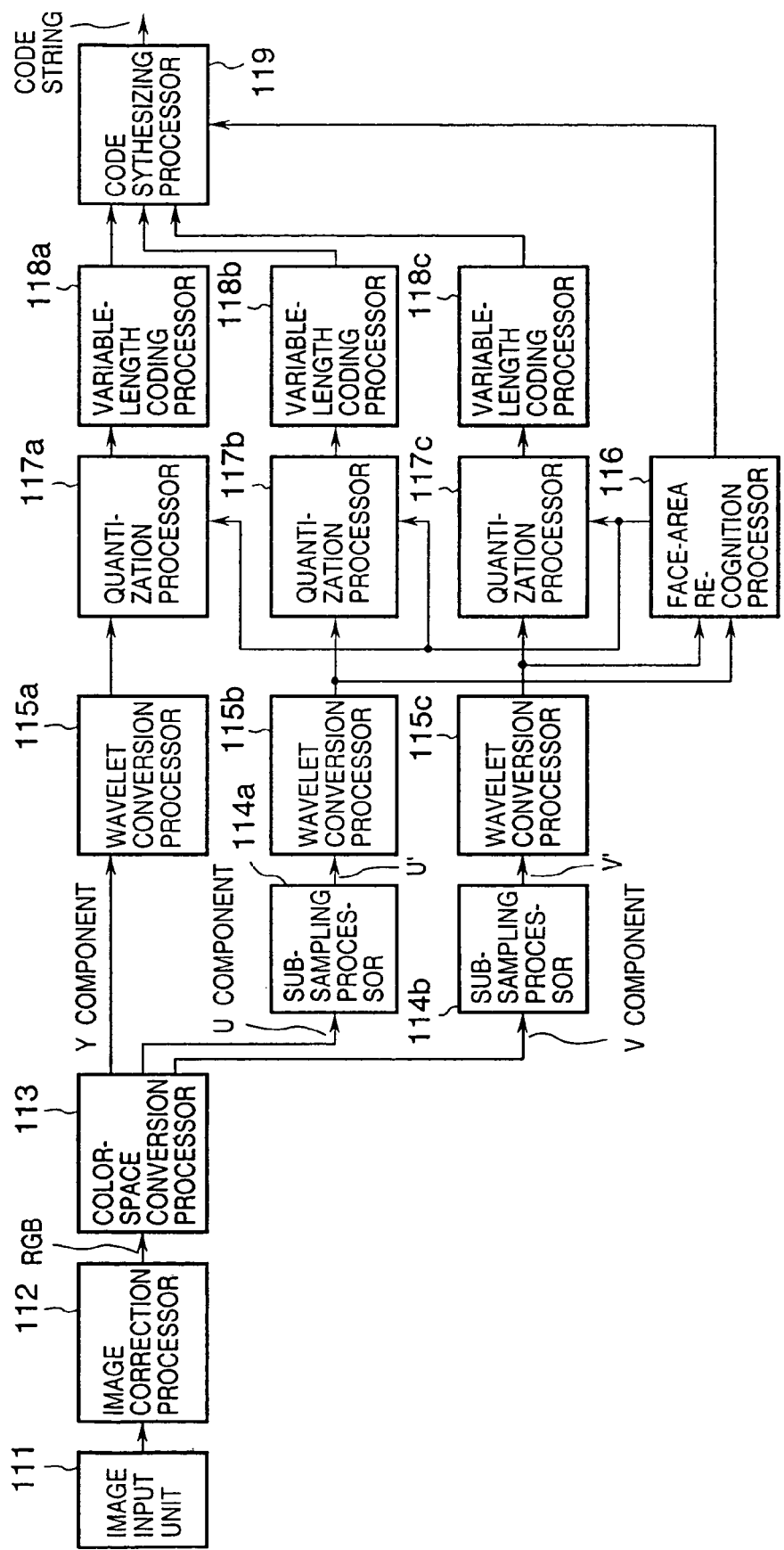
FIG. 1 is a block diagram showing the construction for image coding processing according to an embodiment of the present invention.
Figure 2:
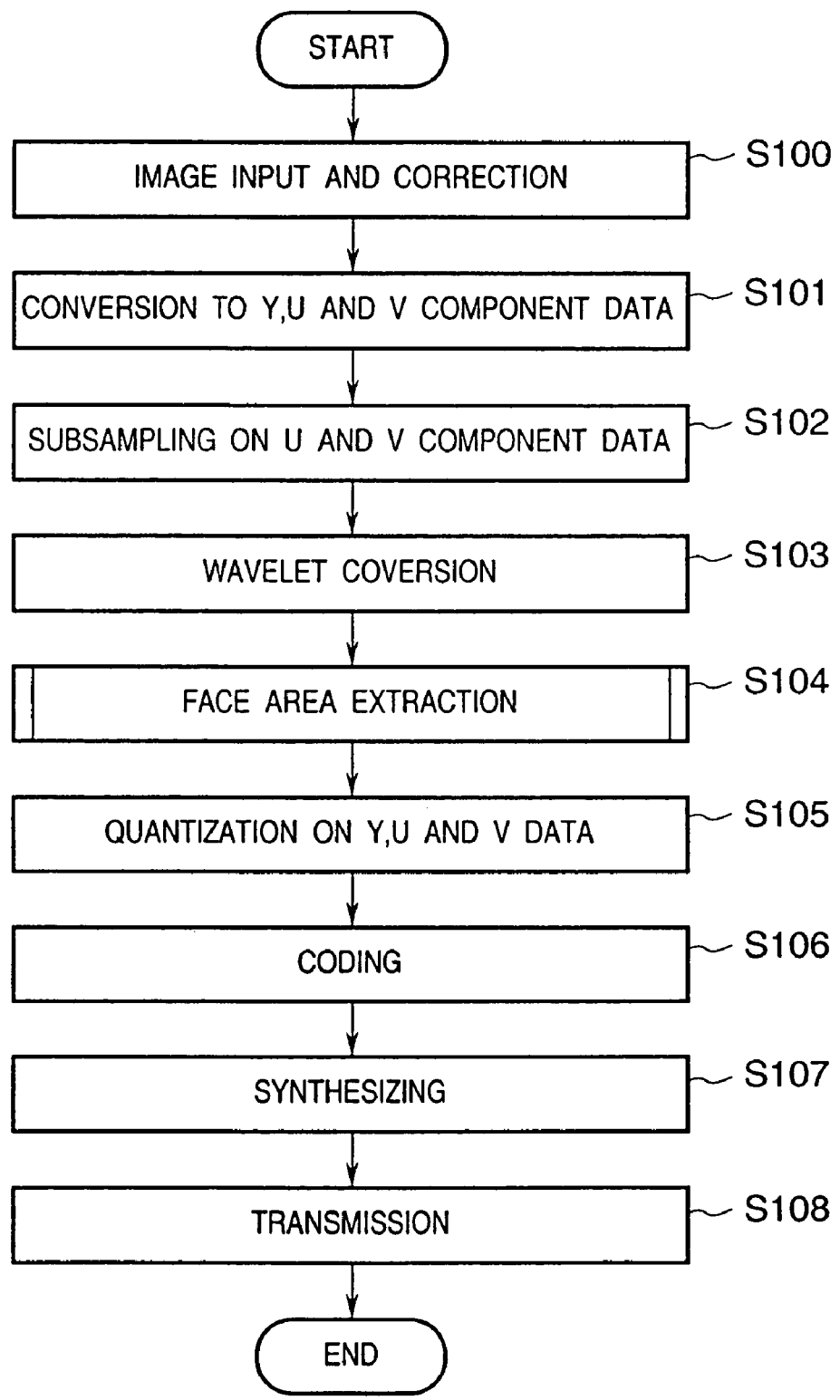
FIG. 2 is a flowchart showing the flow of the image coding processing according to the embodiment.

FIG. 1 is a block diagram showing the construction for image coding processing according to the embodiment of the present invention. FIG. 2 is a flowchart showing the flow of the image coding processing according to the embodiment.

In FIG. 1, reference numeral 111 denotes an image input unit which A/D converts an analog video signal obtained by a image sensing device, and outputs the converted signal as a digital image signal; 112, an image correction processor which performs desired processing of various correction processings such as image-size format generation, noise removal and resolution correction (step S100 in FIG. 2); and 113, a color-space conversion processor which performs color-space conversion processing on RGB digital image data as outputs from the image correction processor 112, to generate luminance and color difference signals, Y, U and V signals (step S101 in FIG. 2). The color-space conversion processor 113 performs conversion by matrix calculation in accordance with, e.g., the following conversion equation (1):

$$Y(I,J)=0.299*R(I,J)+0.587*G(I,J)+0.114*B(I,J)$$

$$U(I,J)=0.500*R(I,J)-0.419*G(I,J)-0.081*B(I,J)$$

$$V(I,J)=0.169*R(I,J)-0.331*G(I,J)+0.500*B(I,J)\ldots \quad (1)$$

Note that R(I,J), G(I,J), B(I,J), Y(I,J), U(I,J) and V(I,J) respectively represent pixel value of coordinates (I,J).

Numerals 114a and 114b denote subsampling processors which perform subsampling processing on the color difference signals U and V obtained by the color-space conversion processor 113 (step S102 in FIG. 2).

Figure 3:
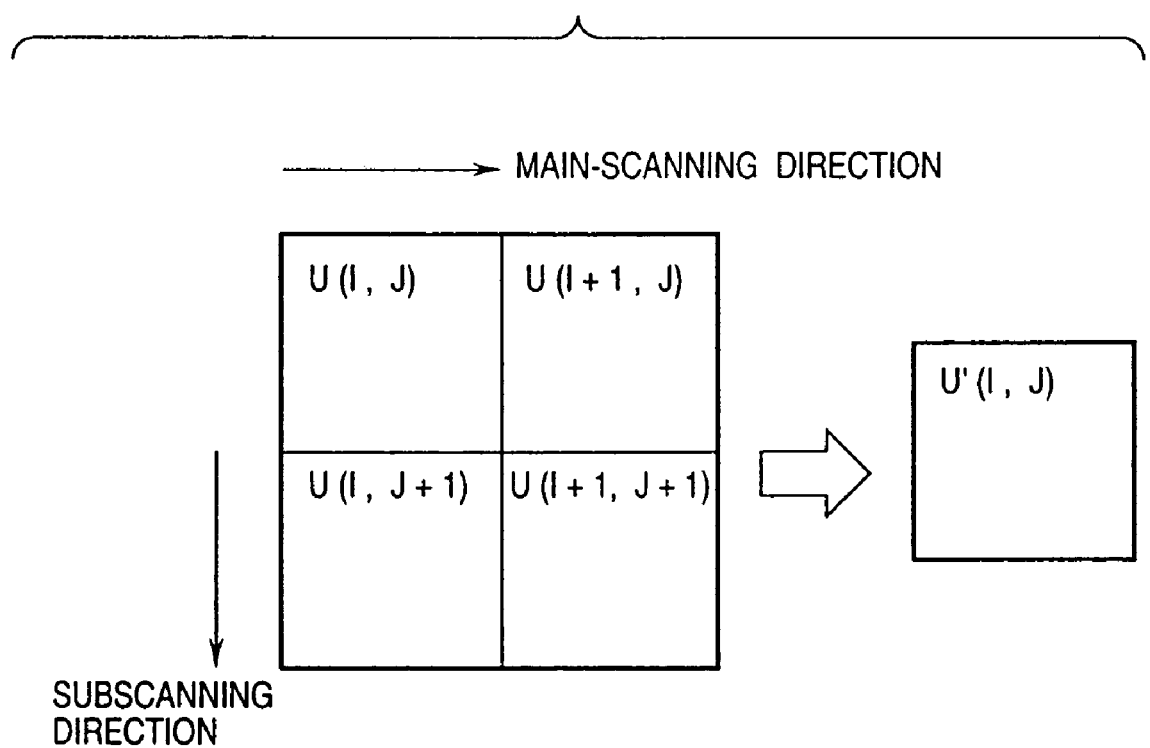
FIG. 3 is an explanatory view of subsampling processing.

FIG. 3 is an explanatory view of the subsampling processing. In the subsampling processor 114a and 114b of the present embodiment, the U and V signals as color difference components are subsampled to ½ in both main-scanning direction and subscanning direction. More specifically, subsampling data U' and V' of the U and V components are obtained by, e.g., the following equation (2):

$$x'(I,J)=(x(I,J)+x(I+1,J)+x(I,J+1)+x(I+1,J+1))/4$$

$$x: U \text{ or } V \ldots \quad (2)$$

The subsampling processing reduces the data amount of the color difference components to ¼ with respect to the luminance signal.

Numerals 115a to 115c denote wavelet conversion processors which respectively perform wavelet conversion processing on the Y component and the subsampled U and V components (step S103 in FIG. 2); and 116, a face-area recognition processor which recognizes a face area of a person in a read image, by utilizing the conversion coefficients of the luminance and color difference components obtained by the wavelet conversion processors 115a to 115c (step S104 in FIG. 2).

Numerals 117a to 117c denote quantization processors which respectively perform quantization processing on the wavelet conversion coefficients obtained by the wavelet conversion processors 115a to 115c (step S105 in FIG. 2). The quantization processing is performed by selectively using a plurality of quantization tables based on the result of recognition by the face-area recognition processor 116. More specifically, in an area determined as a face area, small quantization coefficients (quantization coefficients with narrow quantization step widths) are used, and in other areas, large quantization coefficients (quantization coefficients with wide quantization step widths) are used.

Numerals 118a to 118c denote variable-length coding processors which scan the quantized conversion coefficient arrays and perform entropy coding by the Huffman coding or the like (step S106 in FIG. 2); and 119, a code synthesizing processor which formats the respective color component code data encoded by the variable-length coding processors 118a to 118c and the result of processing by the face-area recognition processor 116 into a predetermined frame (step S107 in FIG. 2). For example, the result obtained from 1-frame image data is data-structurized in a particular order which is, e.g., various header information such as an image size, information on the recognition result, a Y-component quantization table, Y-component code data, a U-component quantization table, U-component code data, a V-component quantization table, and V-component code data. The code string obtained by the above processing is transmitted onto a communication line by a general controller (not shown) and a communication controller (not shown) (step S108 in FIG. 2).

Figure 4:
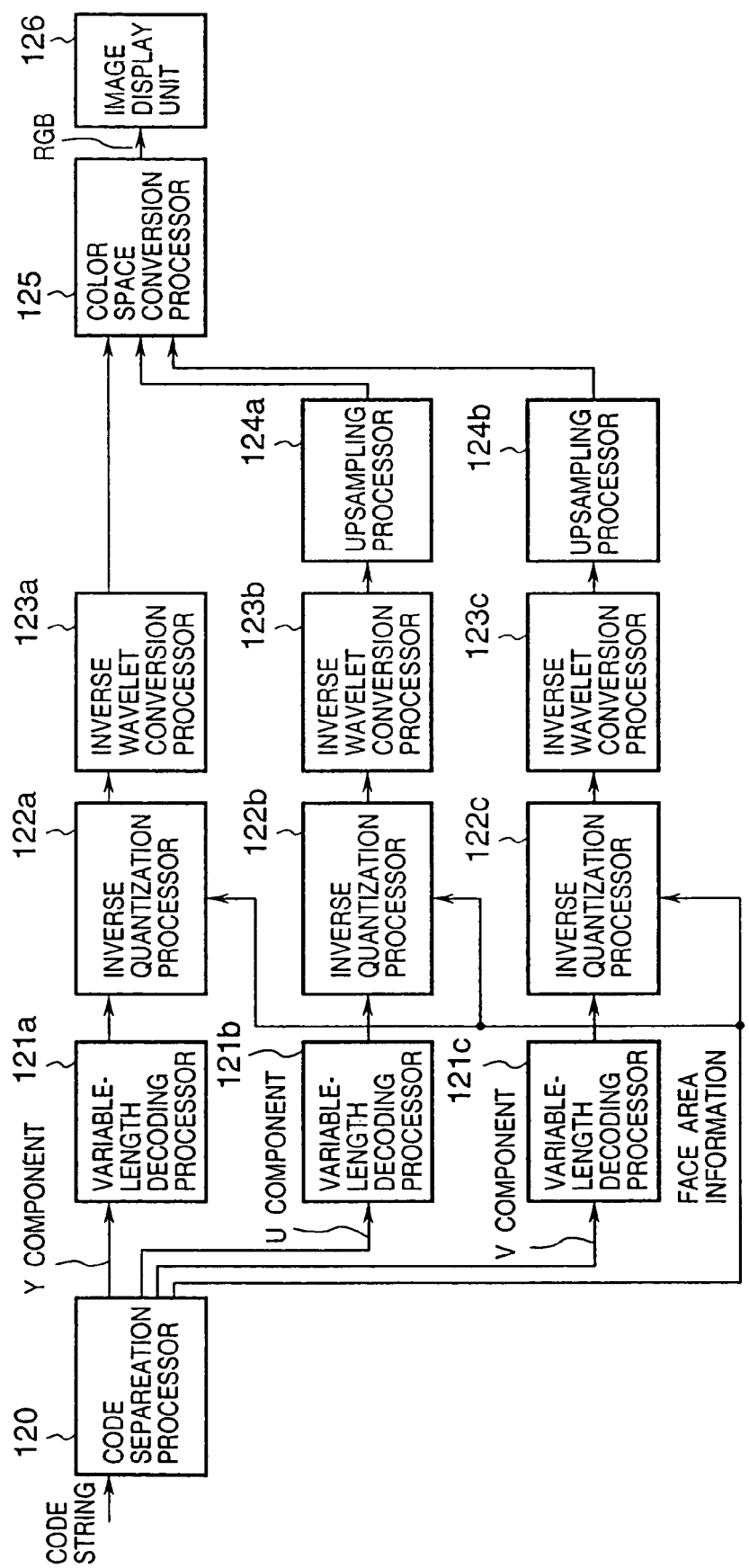
FIG. 4 is a block diagram showing the construction for image decoding processing according to the embodiment.
Figure 5:
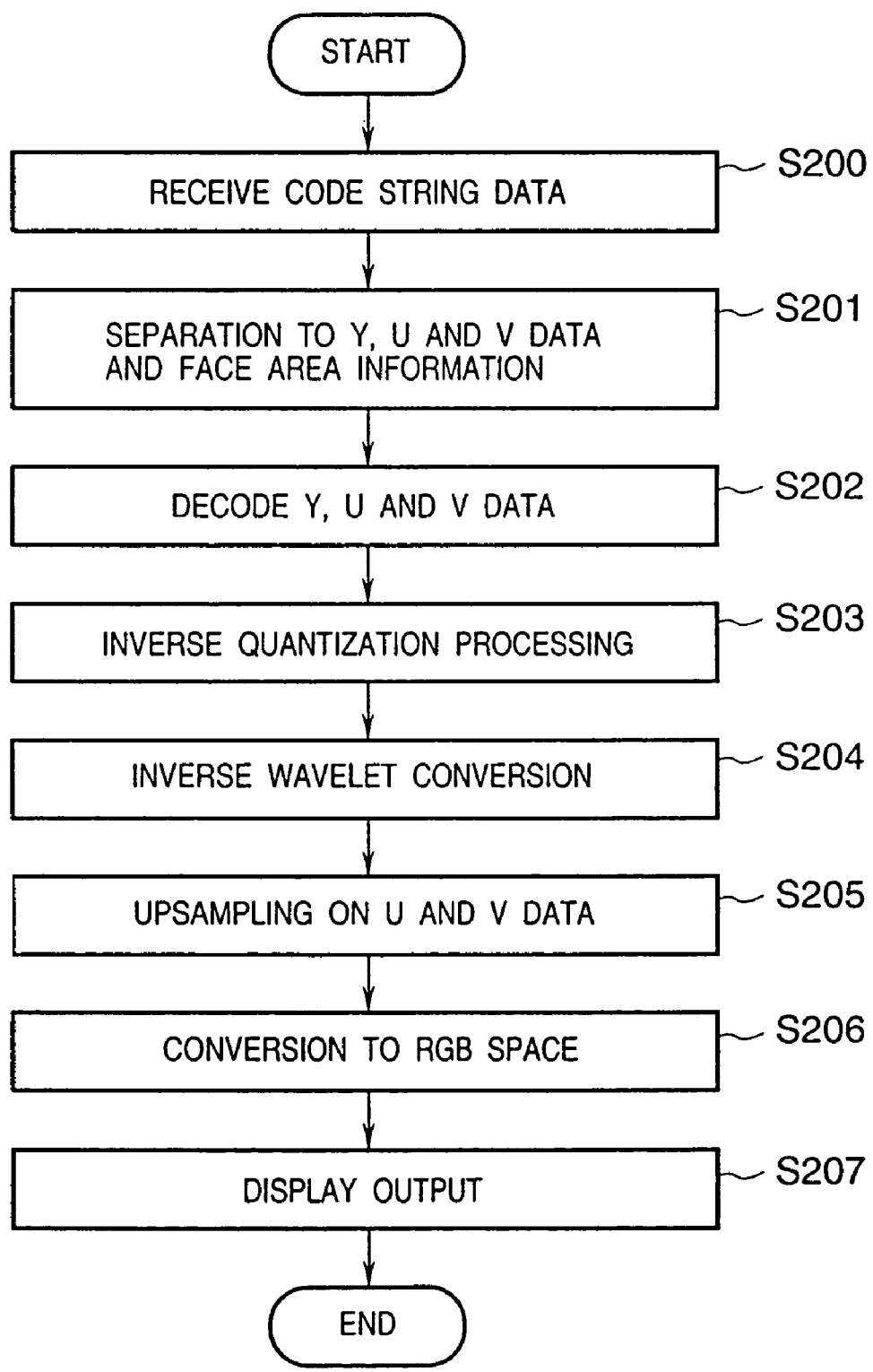
FIG. 5 is a flowchart showing the flow of the image decoding processing according to the embodiment.

Next, processing on the receiving side to receive the code string which was compressed, encoded and transmitted as described above, then decode and decompress the code string and perform image display will be described. FIG. 4 is a block diagram showing the construction for image decoding processing according to the embodiment. FIG. 5 is a flowchart showing the flow of the image decoding processing according to the embodiment.

The code string transmitted onto the communication line is received by a general controller (not shown) and a communication controller (not shown) (step S200 in FIG. 5). Numeral 120 denotes a code separation processor which separates respective color code data and face area information from the code string in the predetermined format (step S201 in FIG. 5). The face area information represents the result of above-described face area recognition by the face-area recognition processor 116.

Numerals 121a to 121c denote variable-length decoding processors which decode the respective color component code data separated by the code separation processor 120 (step S202 in FIG. 5); 122a to 122c, inverse quantization processors which inverse-quantize the wavelet conversion coefficients decoded by the variable-length decoding processors 121a to 121c (step S203 in FIG. 5). Note that upon inverse quantization, quantization coefficients are selected in accordance with the face area information separated by the code separation processor 120. That is, in each area, inverse quantization is performed with quantization coefficients in the same quantization table as that used upon compression.

Numerals 123a to 123c denote inverse wavelet conversion processors which perform inverse wavelet conversion processing on the wavelet conversion coefficients obtained by the inverse quantization processors 122a to 122c (step S204 in FIG. 5); and 124a and 124b, upsampling processors which perform upsampling processing on the subsampled color difference components U and V, to generate U and V components having the same number of pixels as that of the luminance component Y. In the upsampling processing, linear interpolation or the like is performed. Numeral 125 denotes a color-space conversion processor which performs conversion processing on the luminance signal Y and the upsampled U and V signals into R, G and B signals (step S206 in FIG. 5). This conversion processing can be also made by simple matrix calculation or the like using the inverse conversion equation (1). Numeral 126 denotes an image display unit which performs image display based on the generated R, G and B data on a display device (step S207 in FIG. 5).

Figure 6:
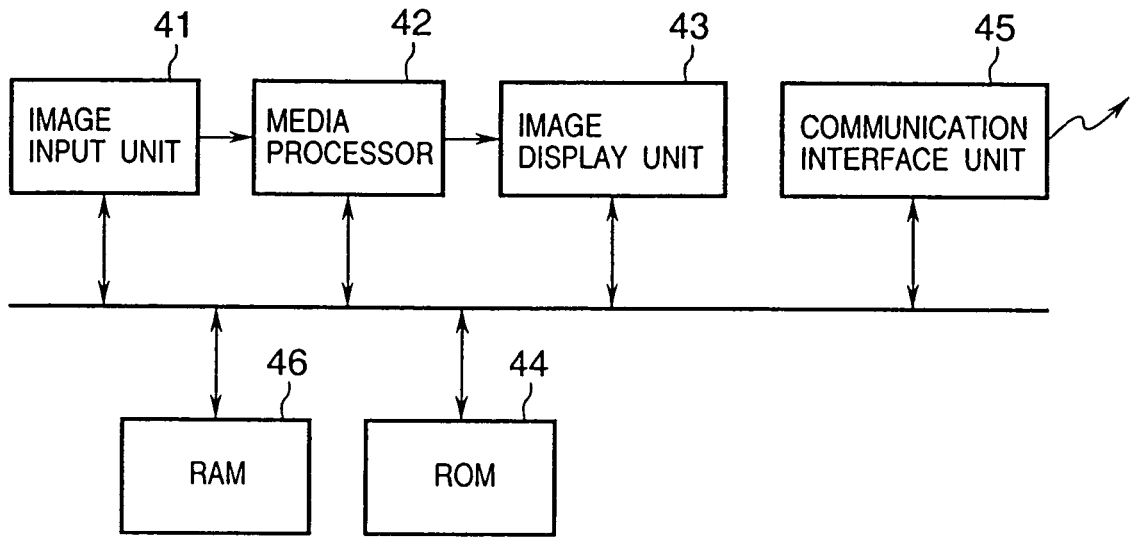
FIG. 6 is a block diagram showing an example of the construction of apparatus when principal processings according to the embodiment are realized by software.

Next, detailed operations of the principal processors of the present embodiment will be described. FIG. 6 is a block diagram showing an example of the apparatus construction when the principal processings according to the embodiment are realized by software.

In FIG. 6, numeral 41 denotes an image input unit which captures image data obtained by a CCD camera or the like and performs image correction processing (the processing by the image input unit 111 and the processing by the image correction processor 112 in FIG. 1) by hardware; and 42, a processor which performs the principal processings in the present embodiment. The processor 42 performs various signal processings (e.g., the respective processings shown in the flowchart of FIG. 5) by using a special-purpose media processor for multimedia signal processing, a DSP (Digital Signal Processor) or the like (hereinafter, the processor will be referred to as a "media processor" 42). Numeral 46 denotes a RAM (Random Access Memory) which is used as a work memory for operation of the media processor 42 and a buffer memory for various image data to be processed. The RAM 46 is realized by a high-speed large-capacity memory such as an SDRAM (Synchronous DRAM).

Numeral 44 denotes a ROM (Read Only Memory) for storing a command program necessary for the operation of the media processor 42. The ROM 42 holds a command program to cause the media processor 42 to perform the image coding processing and image decoding processing described with reference to FIGS. 1 to 5. Numeral 43 denotes an image display unit which serves as a display device or an interface for the display device, for performing display based on decoded image data or the like; and 45, a communication interface unit comprising a modem, a LAN interface and the like, for data communication with another terminal. The compressed image data is transmitted onto a communication line or the like via the communication interface unit 45.

Figure 7:
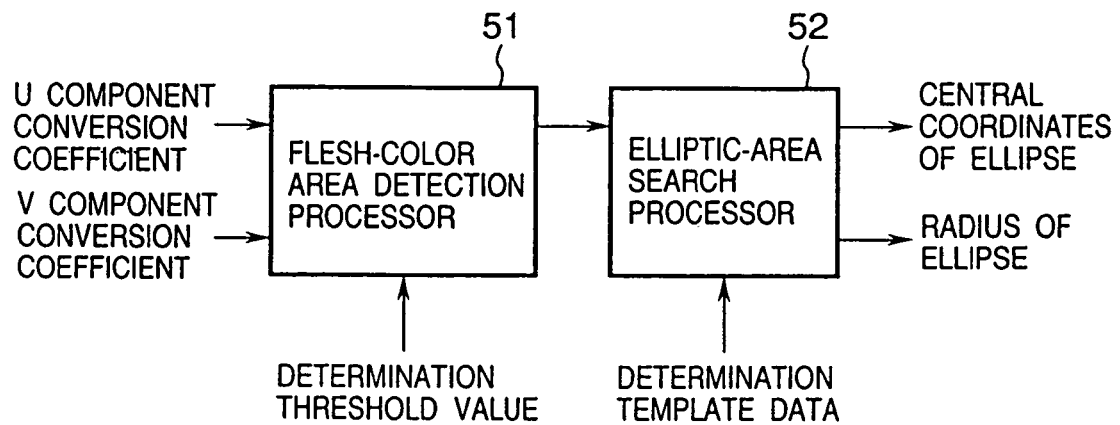
FIG. 7 is a block diagram showing the construction of a face-area recognition processor 116 (FIG. 1)

FIG. 7 is a block diagram showing the construction of the face-area recognition processor 116 (FIG. 1). In the present embodiment, for the sake of simplification of processing, face area recognition is made by modeling a face area of a person into an elliptic area and searching a flesh-color elliptic area. This modeling facilitates pattern matching and further greatly reduces the amount of information upon transmission of area information. Further, in the present embodiment, the amount of search processing necessary for recognition can be greatly reduced by utilizing the wavelet conversion coefficients of a lowest frequency component regarding subsampled UV components. Further, additional preprocessing such as noise removal is unnecessary by utilizing the low-frequency component data. Generally, noise is a high-frequency component, and in the lowest frequency component data handled in the present embodiment, high-frequency components are removed. Further, in the present embodiment, the size of the elliptic area is fixed so as to realize higher speed processing.

In FIG. 7, numeral 51 denotes a flesh-color area detection processor which detects a flesh color area by comprising the lowest frequency component of the wavelet conversion coefficients for the U and V signals with a predetermined threshold value. The flesh-color area detection processor 51 generates a binary image bitmap regarding the result of detection. Numeral 52 denotes an elliptic-area search processor which performs search processing to find an elliptic area by performing pattern matching between the binary image bitmap representing the flesh color area generated by the flesh-color area detection processor 51 and predetermined elliptic template data.

Figure 8A:
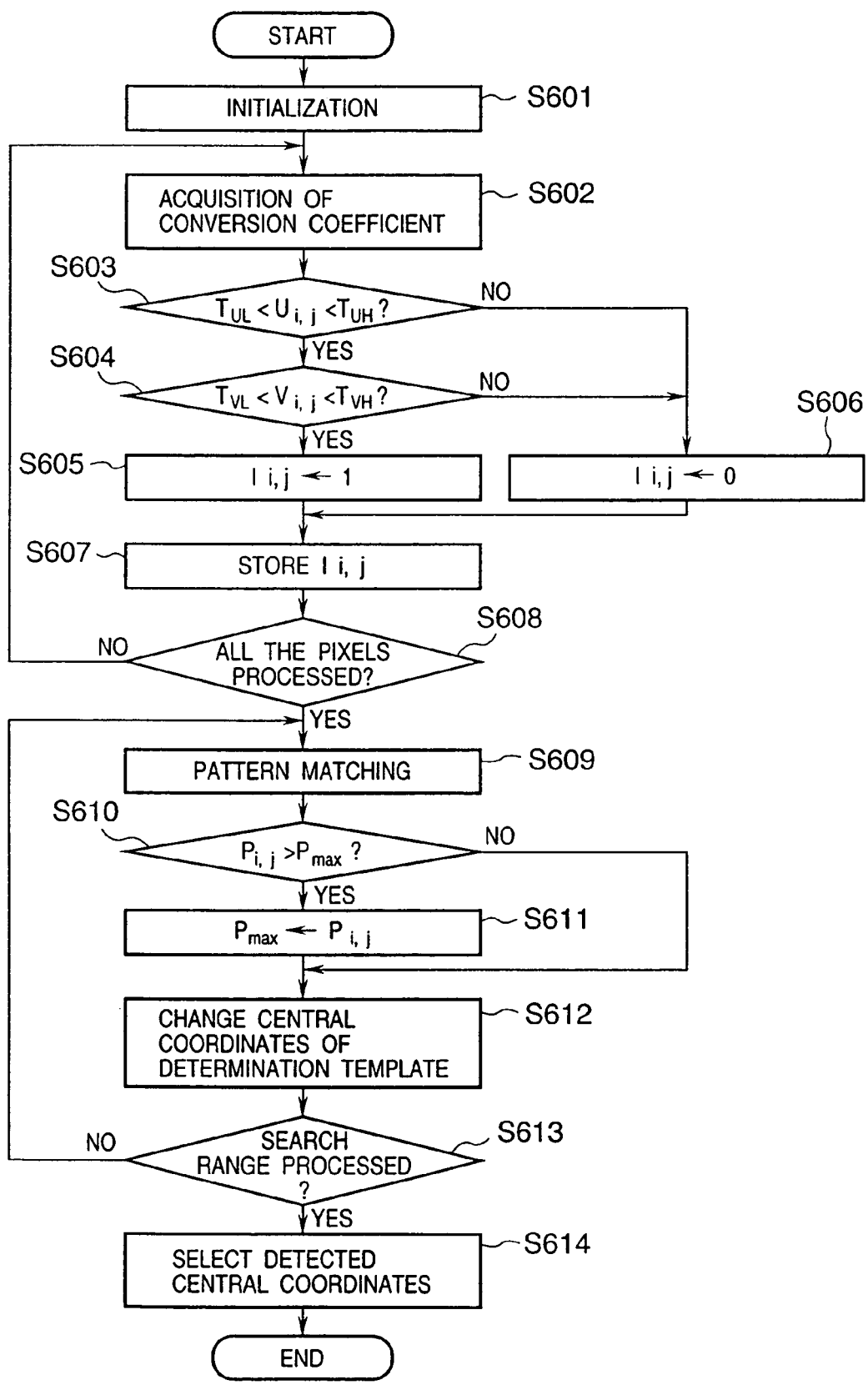
FIGS. 8A and 8B are flowcharts showing a processing procedure when the face-area recognition processor 116 (FIGS. 1 and 7) is realized by software in the construction in FIG. 4.

FIG. 8A is a flowchart showing a processing procedure when the face-area recognition processor 116 (FIGS. 1 and 7) is realized by software in the construction in FIG. [6]4. In this figure, processing at steps S602 to S608 represents processing by the flesh-color detection processor 51; and processing at steps S609 to S613, processing by the elliptic-area search processor 52.

First, at step S601, initialization is performed on various parameters. Next, at step S602, among the wavelet conversion coefficients for the color difference components U and V stored in the RAM 46 used as a buffer memory, data of the lowest frequency component is obtained. At step S603, it is determined whether or not the obtained conversion coefficient value Ui,j (ij: pixel position) resides between a predetermined threshold values $T_{UL}$ and $T_{UH}$. If the U component value resides between these two threshold values, further, it is determined at step S604 whether or not the conversion coefficient value Vi,j of the V component is between predetermined threshold values $T_{VL}$ and $T_{VH}$. If the V component resides within these two threshold values, the pixel value Ii,j of the binary image bitmap is set to 1 at step S605.

That is, it is determined that a pixel, where both U and V components reside within the predetermined threshold range, represents a flesh color, and the pixel value Ii,j corresponding to the pixel is set to 1. Otherwise (NO at any of steps S603 and S604), the pixel value Ii,j is set to 0 at step S606 (i.e., it is determined that the pixel does not represent the flesh color). At step S607, the pixel value set as above is stored into the RAM 46 used as a buffer memory. The above processing is performed on all the conversion coefficients of the lowest frequency component in the entire image area (step S608).

In this manner, a binary image bitmap representing pixels having U component within the range $T_{UL}$-$T_{UH}$ and V component within the range $T_{VL}$-$T_{VH}$, i.e., pixels having the flesh color, is obtained. Then, search processing to detect a face area is performed based on the obtained binary image bitmap.

First, at step S609, pattern matching between a template for determination and the above-described image bitmap obtained by the flesh-color area detection processor 51. More specifically, the template is overlaid on the binary image bitmap generated at steps S602 to S608, and in an overlap portion between the template and the bitmap, the number Pi,j of pixels having pixel values corresponding therebetween is calculated.

Figure 9:
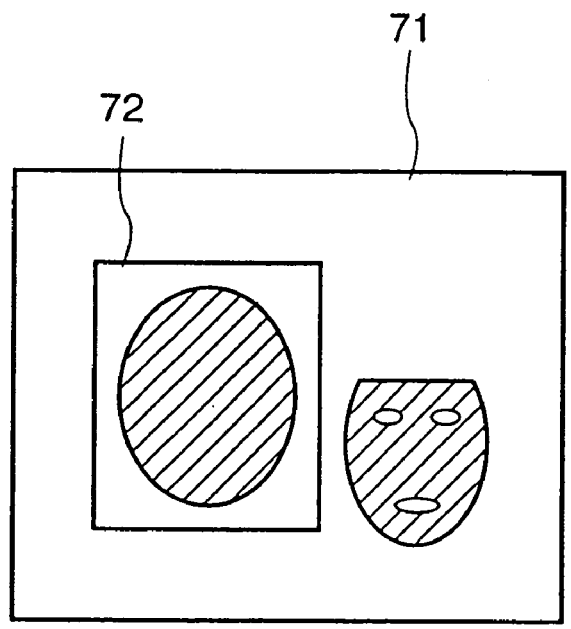
FIG. 9 is an explanatory view of pattern matching for face area detection according to the embodiment.

FIG. 9 is an explanatory view of pattern matching for face area detection according to the embodiment. In FIG. 9, numeral 71 denotes the binary image bitmap obtained by the flesh-color area detection processor 51; and 72, a determination template for determination in pattern matching. At step S609, the determination template 72 is placed on the binary image bitmap 71, and in an area where the determination template 72 overlaps with the binary image bitmap 71, the number $P_{i,j}$ of pixels with pixel values corresponding between the template and the bitmap is counted. Note that alphabets i and j are coordinate values representing the central position of the template on the binary image bitmap.

Next, at step S610, the calculated number $P_{i,j}$ of corresponding pixels is compared with a maximum value (Pmax) of the corresponding pixels at that time (the initial value of the Pmax is set to "0" at step S601). Then, if the number $P_{i,j}$ is over the value Pmax, the value Pmax is updated with the value of the number $P_{i,j}$ at step S611. At this time, the values of coordinates (i,j) are also held.

At step S612, the central coordinates (i,j) of the determination template 72 are changed, and the above processing at steps S609 to S612 is repeated until the template is moved through entire search image (step S613). When the template has been moved through the entire search range, the process proceeds to step S614. The coordinate values held at this time are the central coordinates of the face area. That is, in this case, the central coordinates of an area with the greatest number of corresponding pixels in the entire search area are selected.

Note that in the face area determination, it may be arranged such that determination is performed on the central area of the image prior to other areas. The method of such face area determination will be described with reference to FIG. 10 and FIG. 8B.

Figure 10:
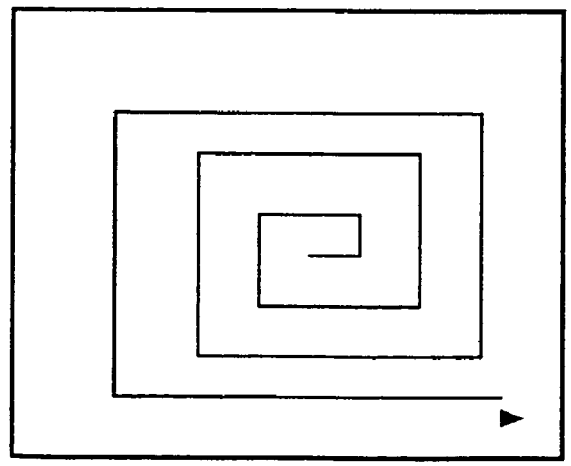
FIG. 10 is an example of template scanning order according to the embodiment.

FIG. 10 is an example of template scanning order according to the embodiment. In FIG. 10, a spiral-formed arrow represents the tail of movement of the template central coordinates (i,j) which sequentially moves from the center of the image toward the peripheral portion. That is, at step S612, coordinate values (i,j) necessary for execution of scanning as shown in FIG. 10 are generated.

Figure 8B:
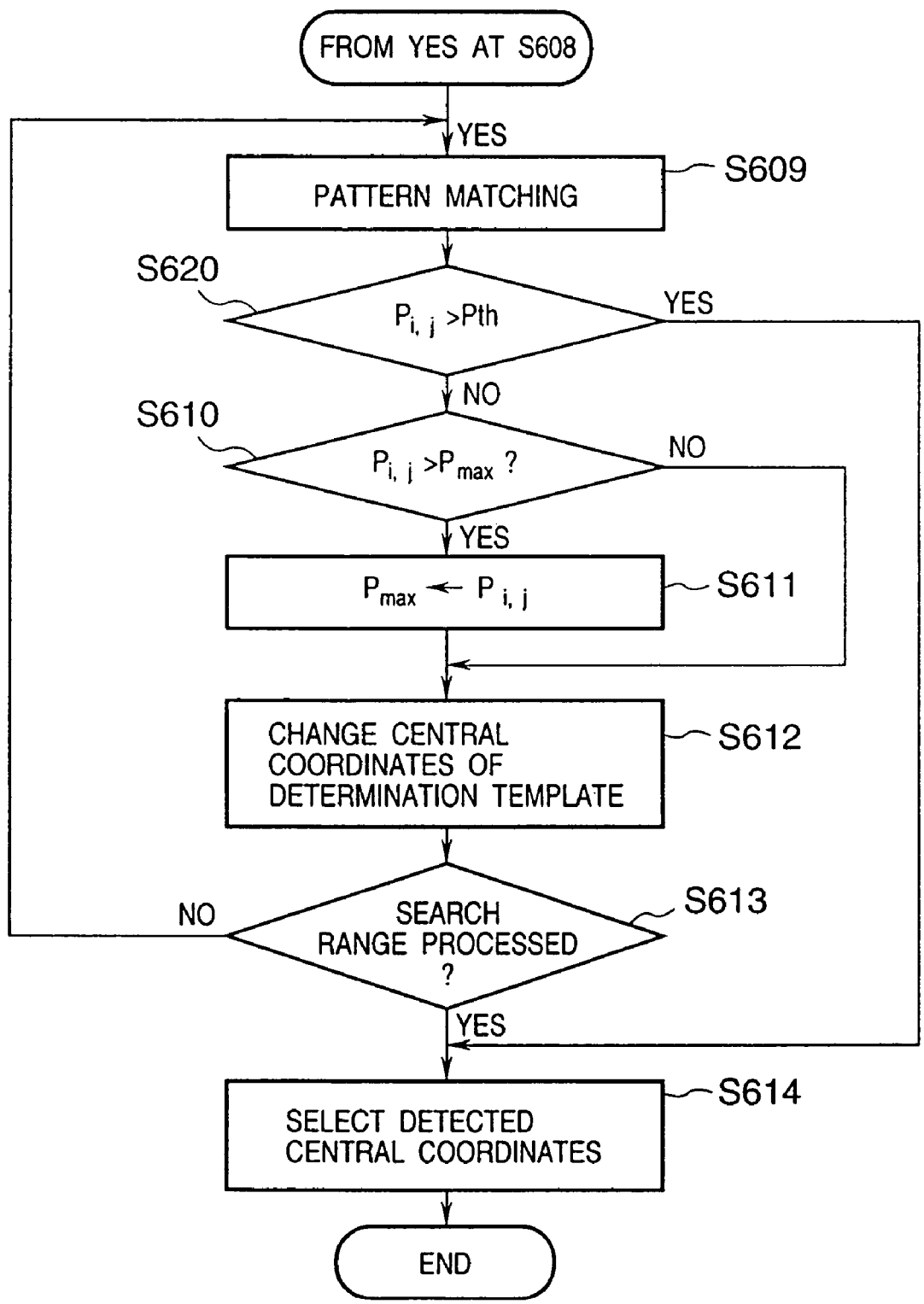

FIG. 8B is a flowchart showing the face area search processing in a case where the face area detection is made from a predetermined portion (if the template is moved as shown in FIG. 10, the predetermined portion is around the center of the image) prior to other portions. The flowchart of FIG. 8B shows a part of the processing corresponding to steps S609 to S614. Note that Pth is set to a predetermined value. At step S609, the above-described pattern matching is performed, and the number $P_{i,j}$ is obtained. Then, at step S620, if it is determined that $P_{i,j}>Pth$ holds, the search is terminated at that time (and the process proceeds to step S614), and the coordinate values at that point become the center of the face area. In a video conference system or the like, generally, a face area is positioned at the center of an image, therefore, this scanning method easily reduces the frequency of occurrence of erroneous determination. Additionally, when a portion over the value Pth is found, the search can be terminated and it is not necessary to perform the search in the entire search area. Therefore, the processing speed is enhanced.

Note that in the processing in FIG. 8B, if any portion over the value Pth is not found in the entire search range, a position (i,j) having the maximum $P_{i,j}$ in the search range is selected.

Further, as a method to start the search first from a position near the center of the image, it may be arranged such that in the entire search area, areas having values within the range of Pmax ±α are held, and a position closest to the central portion is selected from a portion near the central portion based on the areas held at step S614.

As described above, by performing pattern matching while scanning the determination template 72 over the entire search range on the binary image bitmap 71, the coordinates (i,j) having the maximum $P_{i,j}$ are obtained (step S613). Then, the obtained coordinates (i,j) are outputted as the central coordinates of the face area (step S614). Note that the size and shape of the face area represented by the face area information correspond with the ellipse of the determination template 72.

The above-described processing realizes face-area recognition processing with a simple method, and as a result of face area recognition, central coordinates c(i,j) of the ellipse are obtained. Note that more precise face area recognition can be performed by repeating the above processing while changing the radius of the ellipse. In this case, templates having plural radii are prepared in advance, and the above-described processing at steps S609 to S613 is repeated using the various templates.

Figure 11:
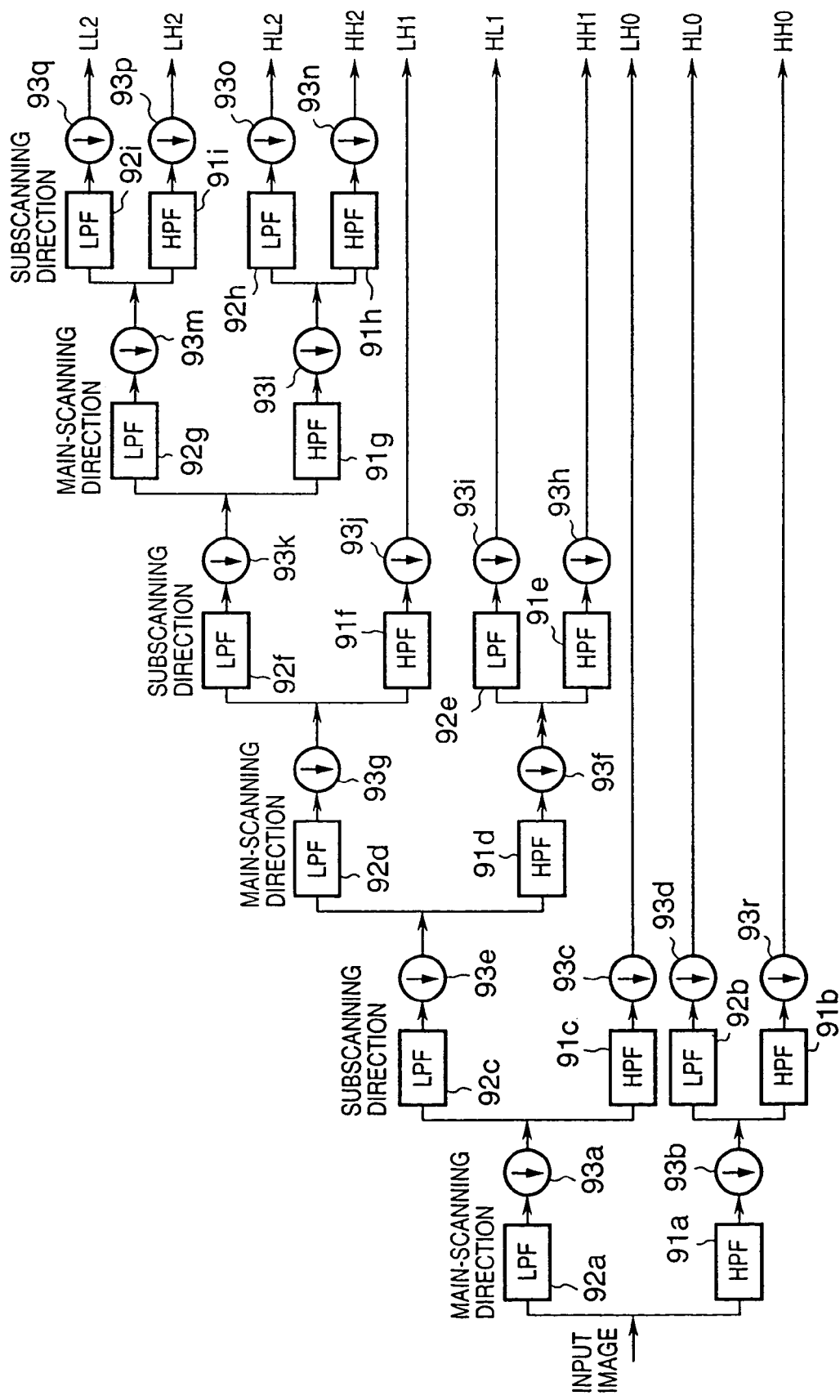
FIG. 11 is a block diagram showing the construction of a wavelet conversion processor.

Next, the wavelet conversion processors 115a to 115c will be described. FIG. 11 is a block diagram showing the construction of a wavelet conversion processor. The wavelet conversion processors 115a to 115c perform wavelet conversion processing by, e.g., a filter bank as shown in FIG. 11.

In FIG. 11, numerals 91a to 91i denote high-pass filters (HPF); and 92a to 92i, low-pass filters (LPF). The filters perform filtering processing using predetermined coefficients. Numerals 93a to 93r denote ½ downsamplers which perform ½ scale thinning processing on filtered data. Various filter coefficients are proposed for wavelet conversion, and any of conversion coefficients can be applied to the present embodiment. For example, in the ISO standard MPEG-4 method, filters with the following coefficients are studied:

$$\text{LPF } \{0.03314563036812, -0.06629126073624,\\ -0.17677669529665, 0.41984465132952,\\ 0.99436891104360, 0.41984465132952,\\ -0.17677669529665, -0.06629126073624,\\ 0.03314563036812\}; \text{HPG}\\ \{-0.353553399059327, 0.70710678118655,\\ -0.353553399059327\} \quad (3)$$

More specifically, various conversion coefficients HH0 to LL2 are obtained by sequentially performing processing in accordance with the structure of the filter bank as shown in FIG. 11 by using an FIR filter having coefficients as represented by the expression (3).

Figure 12:
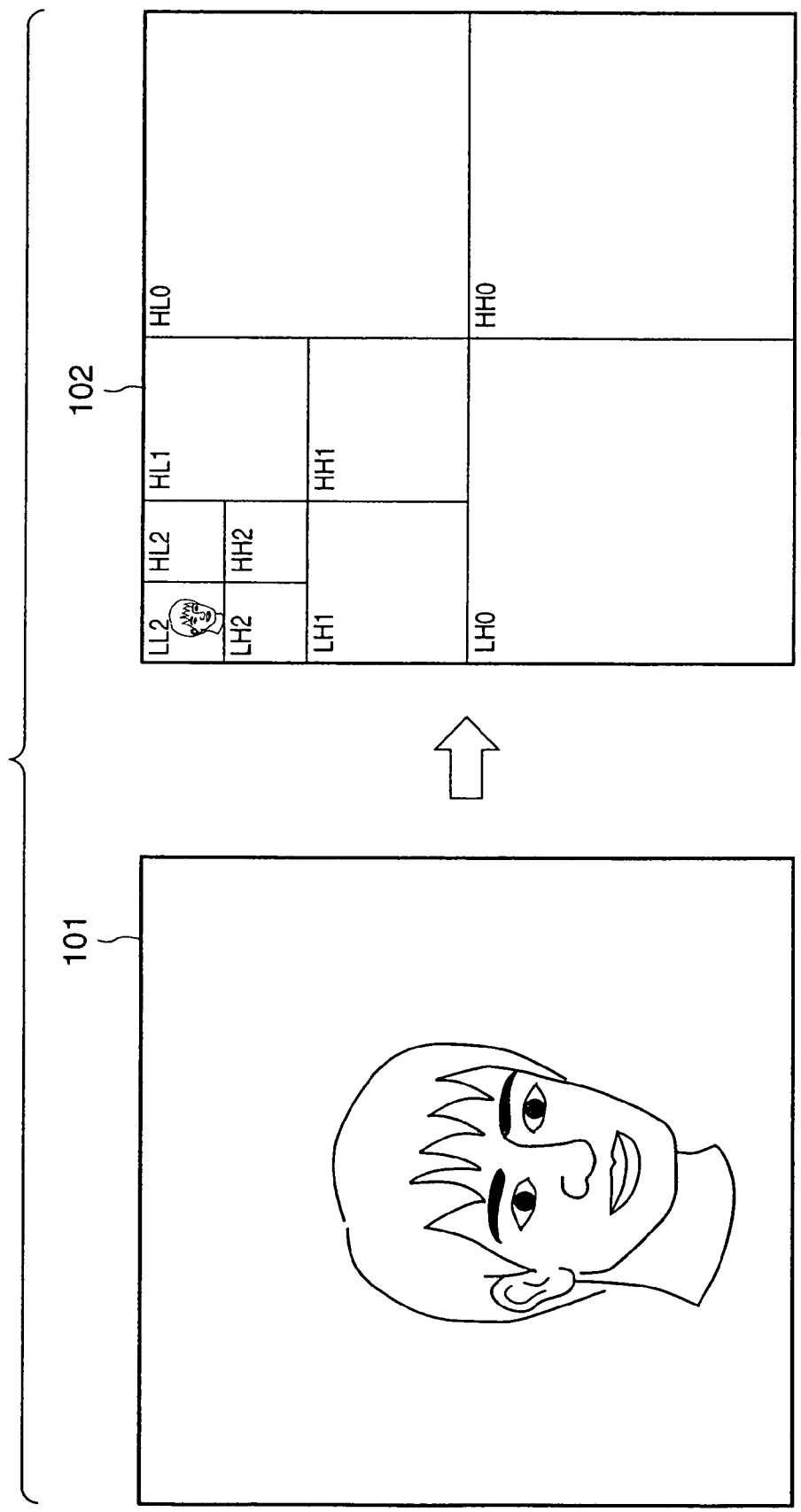
FIG. 12 is an explanatory view of wavelet conversion.

FIG. 12 is an explanatory view of wavelet conversion. Numeral 101 denotes an original image before conversion; and 102, conversion coefficients obtained by the conversion. Numerals HH0 to LL2 in FIG. 11 correspond to various frequency components HH0 to LL2 in FIG. 12. The LL2 component is conversion coefficient data for the lowest frequency component which includes a large amount of macro information of the original image. The number of pixels of this data is small. In the present embodiment, the face area recognition is made by utilizing the LL2 components of the U and V components (step S602 in FIG. 8A).

Next, quantization processors 117a to 117c will be described. The quantization processor 117a performs quantization processing on the various conversion coefficients obtained by the wavelet conversion processing. FIG. 13 is a table showing quantization coefficient values according to the embodiment. In the present embodiment, for the sake of simplicity, simple quantization processing is performed. As shown in FIG. 13, quantization coefficient values are respectively determined for the components HH0 to LL2 of the respective conversion coefficients, and greater quantization coefficients are determined for the high frequency components. The quantization using these quantization coefficients increases the coding efficiency while suppressing degradation of visual image quality.

Further, in the present embodiment, in accordance with the result of face area recognition, the quantization coefficients for the conversion coefficients, other than the lowest frequency component (LL2) and positioned out of the elliptic area, have values greater than those of the quantization coefficients for the conversion coefficients positioned within the elliptic area, as shown in FIG. 13. For example, for the face area with the component LH2, the quantization width is set as Q×2; for the other areas than the LH2 face area, the quantization width is set as Q×8. In this arrangement, many of the conversion coefficients for the high frequency components out of the face area are quantized to 0. Accordingly, the coding amount can be greatly reduced without causing serious degradation of subjective image quality.

Further, as the quantization processing according to the present embodiment is performed on the entire image area, at once, even in use of large quantization coefficients, block distortion or mosquito noise which occurs by DCT-based coding processing in block units does not occur in principle. Accordingly, even in a case where very large quantization coefficients are used in quantization for the high frequency components in an area other than a face area, the area is visually sensed as an image with low spatial frequency. Thus, generation of extremely unnatural image can be avoided.

Further, as shown in FIG. 13, even in a simple method of changing two quantization coefficients for the inside or outside of the face area, no problem occurs since the pseudo outline of the image caused by the difference between the quantization coefficients is smoothed by the inverse conversion filtering upon decoding.

Figure 14:
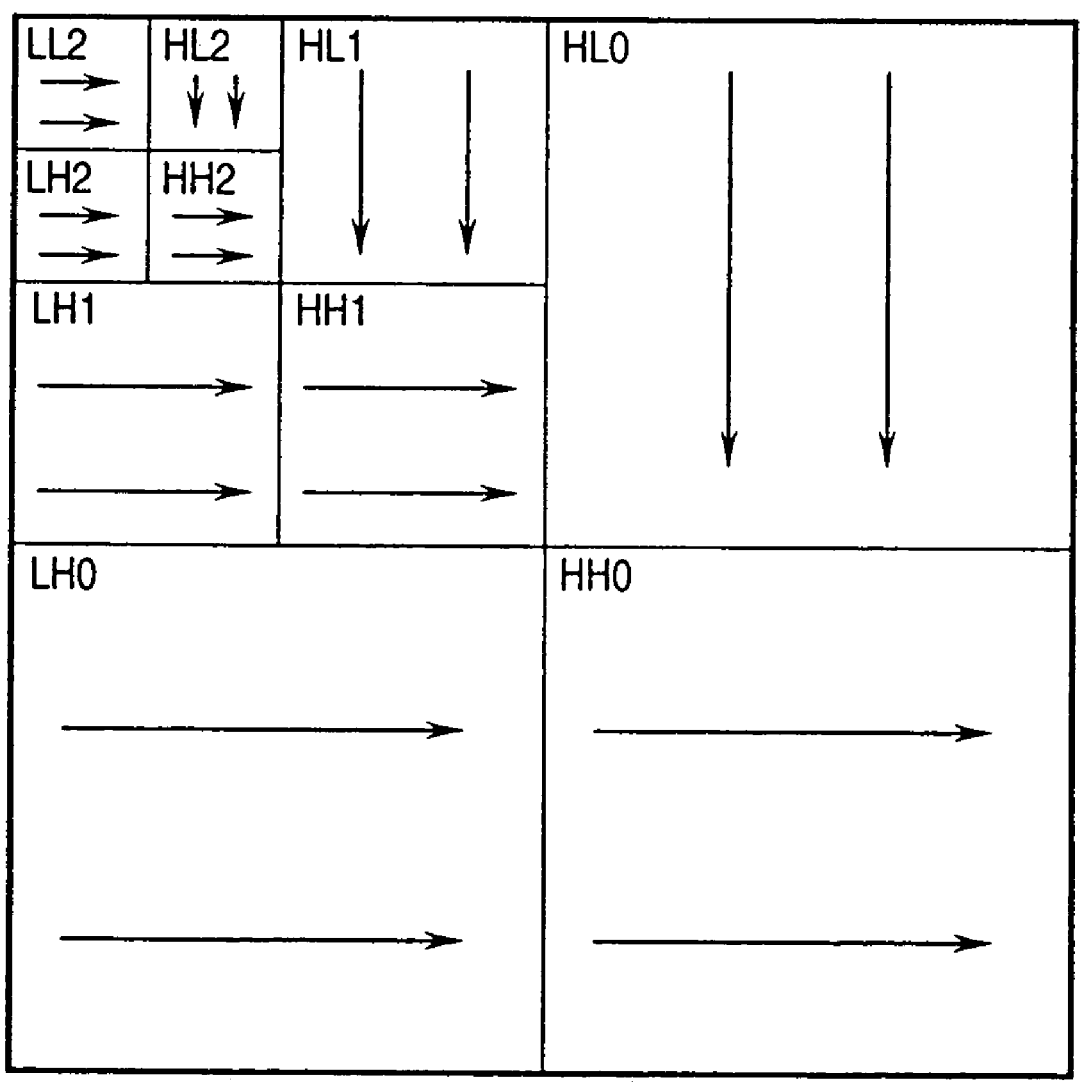
FIG. 14 is an explanatory view showing an example of image scanning upon Huffman coding in the embodiment.

Next, the variable-length coding processors 118a to 118c will be described. The variable-length coding processors 118a to 118c scan and Huffman-encode the conversion coefficients quantized by the quantization processors 117a to 117c. FIG. 14 is an explanatory view showing an example of image scanning upon Huffman coding in the present embodiment. The image data is scanned and Huffman-encoded in the order represented by an arrow. As many of the conversion coefficients determined as coefficients out of the face area based on the result of face area recognition are 0, the coding amount is greatly reduced.

As described above, adaptive quantization based on the result of face area recognition is performed on the respective color components, and obtained code data are synthesized in a predetermined frame format by the code synthesizing processor 119. Further, at the same time, the central coordinates and radius information and the like of the elliptic area indicating the result of face area recognition are converted in the frame format by the code synthesizing processor 119. Such face area information is included in e.g. header information of code data string and transmitted. In the present embodiment, as a face area is modeled as an ellipse, the amount of transmitted information is very small, which almost does not influence the coding amount.

On the other hand, on the receiving side, as described in FIGS. 4 and 5, the code separation processor 120 separates the information indicative of face area (face area information) and the respective color component code data from the received data. The variable-length decoding processors 121a to 121c decode the Huffman-coded data, to reproduce the quantized conversion coefficient values. The inverse quantization processors 122a to 122c select the quantization tables in inverse quantization by utilizing the face area information, and inverse-quantize the decoded conversion coefficients with the same coefficients as those used in quantization. Then, normal wavelet inverse conversion processing is performed on the inverse-quantized wavelet conversion coefficients, so as to generate image data. The image data is used for display on the image display unit in accordance with necessity.

As described above, according to the present embodiment, even in control on quantization coefficients by utilizing the result of face area recognition, image quality of other areas than a face area is not seriously degraded, and the border between the face and non-face areas is not unnatural. Further, even if the precision of face area recognition is not sufficiently high, the probability of generation of extremely unnatural image is low. Accordingly, high-performance image compression can be realized by the processing according to the present embodiment combined with a simple area recognition technique, without special filter and the like which are conventionally necessary for correction. Thus the high-performance image compression can be easily realized by software using a media processor or the like.

Further, the present embodiment provides a high-quality and high-performance coding device applicable to a device which mainly transmits images of persons in a video conference or the like, with a simple construction.

Note that in the present embodiment, the simple template matching has been described as the face area recognition method, however, the present invention is not limited to this method, but any other more sturdy method utilizing genetic algorithm, a neural network or the like, can be used.

Further, in the present embodiment, the face area recognition is made with wavelet conversion coefficients of the U and V components, however, determination may be made by utilizing the conversion coefficients of the Y conversion coefficients.

Further, in the present embodiment, the face area is modeled into an elliptic area for recognition processing, however, the face area may be modeled into a more complicated shape for more precise face area recognition.

It should be noted that, in case where face area is modeled into an elliptic area, the face area can be represented by using parameters (major axis, minor axis and center position). Therefore, information amount can be reduced in comparison with case where the face area is represented by bit-map data.

Further, in the present embodiment, in the method for flesh color detection by the face-area recognition processor, the simple method of comparing the respective U and V color component values with two threshold values (steps S603 and S604 in FIG. 8A) has been described for high-speed and simple processing, however, the present invention is not limited to this method. Any other color space and method may be used for more precise determination.

Figure 15A:
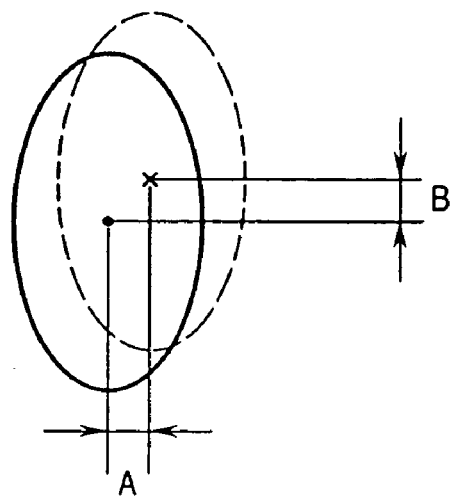
FIGS. 15A and 15B are explanatory views of extraction processing for plural face areas.
Figure 15B:
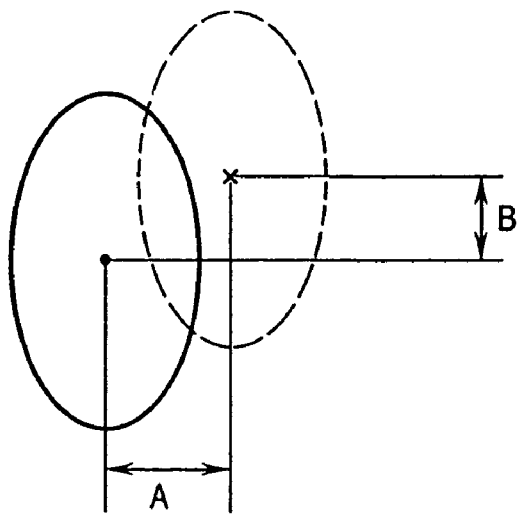

Further, in the present embodiment, the method for detecting a single face area has been described, however, the present invention is not limited to this method. Detection of a plurality of face areas, and quantization control on a plurality of areas based on the result of recognition may be performed. In this case, the value Pi,j greater than a predetermined value and its coordinate value (i,j) are held, and if two areas are away from each other by a predetermined distance or longer in vertical and horizontal directions, these areas are determined as independent face areas. For example, in FIG. 15A, as the distances A and B between two areas are shorter than a predetermined value, the areas are not determined as independent face areas. In this case, one of the areas having greater Pi,j value is determined as a face area. On the other hand, in FIG. 15B, as the distance A or B between two areas is greater than the predetermined value, the two areas are determined as independent face areas.

Further, in the present embodiment, coding on continuous still images has been described, however, the compression efficiency can be further increased by performing information compression between frames.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium storing program code for performing the aforesaid processes to a system or an apparatus, reading the program code with a computer (e.g., CPU, MPU) of the system or apparatus from the storage medium, then executing the program.

In this case, the program code read from the storage medium realize the functions according to the embodiment, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides aforesaid functions according to the above embodiment are realized by executing the program code which are read by a computer, the present invention includes a case where an OS (operating system) or the like working on the computer performs a part or entire processes in accordance with designations of the program code and realizes functions according to the above embodiment.

Furthermore, the present invention also includes a case where, after the program code read from the storage medium are written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiment.

As described above, according to the present invention, high-performance image quantization maintaining high image quality can be realized by simple processing.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for extracting a face image area, comprising:
   input means for inputting image data that has been convened into coefficients based on a spatial frequency; and
   extraction means for extracting a face image area of the input image by using low frequency component data of the image data input by said input means,
   wherein said extraction means comprises:
   generation means for generating binary bitmap data by determining from the low frequency component data an area whose color component value falls within a predetermined range; and
   matching means for applying pattern matching processing using a face shape to the binary bitmap data so as to extract the face image area.

2. The apparatus according to claim 1, wherein the coefficients of the input image data are obtained by wavelet conversion, and said extraction means extracts the face image area by using the lowest frequency coefficients of said coefficients.

3. The apparatus according to claim 1, further comprising quantization means for quantizing the coefficients of the input image data,
   wherein said quantization means changes quantization characteristics based on the face image area extracted by said extraction means.

4. The apparatus according to claim 3, wherein the coefficients of the input image data are obtained by wavelet conversion, and said quantization means determines quantization coefficients for each of spatial components obtained by the wavelet conversion so that a quantization step for higher frequency components is larger than a quantization step for lower frequency components.

5. The apparatus according to claim 1, wherein said extraction means searches a central portion of the input image for the face image area prior to searching other areas of the input image.

6. An image processing method for extracting a face image area, comprising the steps of:
   an input step of inputting image data that has been converted into coefficients based on a spatial frequency; and
   an extraction step of extracting a face image area of the input image by using low frequency component data of the image data input at the input step,
   wherein said extraction step comprises the steps of:
   generating binary bitmap data by determining from the low frequency component data an area whose color component value falls within a predetermined range; and
   applying pattern matching processing using a face shape to the binary bitmap data so as to extract the face image area.

7. The method according to claim 6, wherein the coefficients of the input image data are obtained by wavelet conversion, and said extraction step extracts the face image area by using the lowest frequency coefficients of said coefficients.

8. The method according to claim 6, further comprising a quantization step of quantizing the coefficients of the input image data,
   wherein said quantization step changes quantization characteristics based on the face image area extracted by said extraction step.

9. The method according to claim 8, wherein the coefficients of the input image data are obtained by wavelet conversion, and said quantization step determines quantization coefficients for each of spatial components obtained by the wavelet conversion so that a quantization step for higher frequency components is larger than a quantization step for lower frequency components.

10. The method according to claim 6, wherein said extraction step searches a central portion of the input image for the face image area prior to searching other areas of the input image.

11. A computer-readable storage medium on which is stored a control program for causing a computer to implement an image processing method for extracting a face image area, the method comprising the steps of:
   an input step of inputting image data that has been converted into coefficients based on a spatial frequency; and an extraction step of extracting a face image area of the input image by using low frequency component data of the image data input at the input step, wherein said extraction step comprising the steps of:

generating binary bitmap data by determining from the low frequency component data an area whose color component value falls within a predetermined range; and applying pattern matching processing using a face shape to the binary bitmap data so as to extract the face image area.

12. The computer-readable storage medium according to claim 11, wherein the coefficients of the input image data are obtained by wavelet conversion, and said extraction step extracts the face image area by using the lowest frequency coefficients of said coefficients.

13. The computer-readable storage medium according to claim 11, further comprising a quantization step of quantizing the coefficients of the input image data, wherein said quantization step changes quantization characteristics based on the face image area extracted by said extraction step.

14. The computer-readable storage medium according to claim 13, wherein the coefficients of the input image data are obtained by wavelet conversion, and said quantization step determines quantization coefficients for each of spatial components obtained by the wavelet conversion so that a quantization step for higher frequency components is larger than a quantization step for lower frequency components.

15. 1 The computer-readable storage medium according to claim 11, wherein said extraction step searches a central portion of the input image for the face image area prior to searching other areas of the input image.

* * * * *